United States Patent [19]

Uraneck et al.

[11] 4,092,465

[45] May 30, 1978

[54] ADHESIVE FORMULATIONS INCORPORATING HYDROXYL-CONTAINING POLYMERS AND ALKYL SILICATES, BORATES OR CARBONATES

[75] Inventors: Carl A. Uraneck; John E. Burleigh; Oren L. Marrs, all of Bartlesville, Okla.

[73] Assignee: Phillips Petroleum Company, Bartlesville, Okla.

[21] Appl. No.: 747,143

[22] Filed: Dec. 3, 1976

[51] Int. Cl.² ............................ C08K 5/54; C08K 5/55
[52] U.S. Cl. .................................... 526/1; 427/207 B; 260/27 BB; 526/3; 526/6
[58] Field of Search ............... 526/1, 3, 6, 72, 338; 260/42.15, 42.37, 27 BB; 427/207 B

[56] References Cited

U.S. PATENT DOCUMENTS

| | | | |
|---|---|---|---|
| 2,387,481 | 10/1945 | Vincent | 526/3 |
| 2,891,923 | 6/1959 | Phreaner | 260/42.15 |
| 3,041,320 | 6/1962 | Chapin | 526/338 |
| 3,227,675 | 1/1966 | Papalos | 260/42.15 |
| 3,362,931 | 1/1968 | Kraus | 260/42.37 |
| 3,567,680 | 3/1971 | Iannicelli | 260/42.15 |
| 3,891,608 | 6/1975 | Petersen | 526/6 |
| 3,993,853 | 11/1976 | Selman | 526/20 |

OTHER PUBLICATIONS

Sterman & Marsden, "The Effect of Silane Coupling Agents in Improving the Properties of Filled or Reinforced Thermoplastics," Society of Plastics Engineers Inc., 21st Annual Technical Conference, Mar. 1965.

*Primary Examiner*—Paul R. Michl

[57] ABSTRACT

Pressure-sensitive adhesive incorporates an hydroxyl-containing polymer with alkyl silicon, boron or CO containing compounds. The hydroxyl-containing polymer is a rubbery polymer having an alkadienol constituent.

7 Claims, No Drawings

ADHESIVE FORMULATIONS INCORPORATING HYDROXYL-CONTAINING POLYMERS AND ALKYL SILICATES, BORATES OR CARBONATES

BACKGROUND OF THE INVENTION

This invention relates to adhesive formulations. In one of its aspects this invention relates to pressure-sensitive adhesives. In another of its aspects this invention relates to the use of rubbery alkadienol-containing polymers as adhesives. In yet another of its aspects this invention relates to adhesion promoters selected from esters of carbonic, boric or silicic acid. In still another aspect of this invention it relates to adhesive formulations having good resistance to creep.

Although it is known that alkadienol-containing polymers can be used in adhesive formulations, the resistance to creep of such formulations has not been found to be sufficiently high to encourage the use of adhesive formulations containing these polymers, particularly for use as pressure-sensitive adhesives. It has been considered important, therefore, to provide adhesion promoting compounds for use in adhesive formulations along with the alkadienol-containing polymers that will provide adhesive formulations of improved creep resistance. It has now been discovered that CO, boron or silicon containing compounds can be used as adhesion promoters in these compositions, providing relatively cheap and plentiful materials that are easily combined with the alkadienol-containing polymers to yield adhesive formulations of improved creep resistance.

It is therefore an object of this invention to provide pressure-sensitive adhesive formulations having good creep resistance. It is another object of this invention to provide a method for improving the creep resistance of adhesive formulations in which alkadienol-containing polymers are included.

Other aspects, objects and the various advantages of this invention will become apparent upon reading this specification and the appended claims.

STATEMENT OF THE INVENTION

A pressure-sensitive adhesive is provided having as its constituents a rubbery polymer having an alkadienol constituent and adhesion promoters chosen from among CO, boron and silicon containing compounds. In a preferred embodiment the rubbery polymer has as a constituent at least one monohydroxy-alkyl-substituted conjugated diene.

The alkadienol-containing polymers for use in the adhesive formulations of this invention are generally rubbery homopolymers, copolymers or terpolymers containing at least one monohydroxyalkyl-substituted conjugated diene. Possible co- and termonomers include conjugated dienes and copolymerizable vinylidene group-containing monomers.

The monohydroxyalkyl-substituted conjugated dienes (hereinafter referred to as alkadienols) useful as monomers in preparing polymers for the inventive adhesive formulations include those of Formula I:

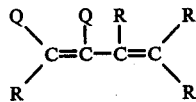

wherein R represents hydrogen or a hydrocarbon radical which is alkyl, cycloalkyl, aryl or combination radical such as aralkyl, alkaryl, alkylcycloalkyl, and the like and the various R groups can be the same or different and wherein Q represents R or a hydroxyalkyl group represented by

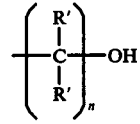

Each R' is individually selected from hydrogen, methyl or ethyl and $n$ is 1, 2 or 3. The alkadienols of Formula I contain one and only one hydroxyalkyl group per molecule. Thus in each such compound, one Q group is R and one Q group is hydroxyalkyl. The alkadienols useful in this invention will generally contain from 5 to 12 and preferably 5 or 6 carbon atoms per molecule.

Exemplary alkadienols are 2,4-pentadien-1-ol; 3,5-hexadien-2-ol; 3,5-hexadien-1-ol; 3-methyl-4,6-decadien-1-ol; 3-cyclohexyl-2,4-pentadien-1-ol; 5-phenyl-2,4-pentadien-1-ol; 6-phenyl-2,4-hexadien-1-ol; 2-p-tolyl-2,4-pentadien-1-ol; 2-methylene-3-buten-1-ol; 2-methyl-3-methylene-4-penten-2-ol; 3-cyclohexyl-2-methylene-3-buten-1-ol; and the like as well as mixtures thereof. Of these, 2,4-pentadien-1-ol; 2-methylene-3-buten-1-ol; and 3,5-hexadien-1-ol are presently preferred. 2,4-Pentadien-1-ol is particularly preferred.

Conjugated dienes useful as co- or termonomers with the above-described alkadienols are those generally containing from 4 to 12 carbon atoms per molecule and preferably from 4 to 6 carbon atoms per molecule. Exemplary conjugated dienes include 1,3-butadiene, isoprene, piperylene, 2,3-dimethylbutadiene, 1,3-hexadiene, 2,4-octadiene, 5-vinyl-5-decene, 2-phenyl-1,3-butadiene and the like as well as mixtures thereof. Butadiene and isoprene are especially preferred.

Co- or terpolymerizable vinylidene-group containing monomers include preferably the monovinyl-substituted aromatic compounds containing from 8 to 16 and more preferably from 8 to 10 carbon atoms per molecule. Examples of useful monovinyl-substituted aromatic compounds include styrene, alpha-methylstyrene, m-vinyltoluene, p-tert-butylstyrene, 1-vinylnaphthalene, 4-ethyl-1-vinylnaphthalene, 6-isopropyl-4-methyl-1-vinylnaphthalene and the like as well as mixtures thereof. It is also within the scope of this invention to employ well-known heteroatom-containing co- or termonomers, such as acrylonitrile, methacrylonitrile, the vinylpyridines, methyl methacrylate, and the like. Styrene is the preferred co- or termonomer of the vinylidene group-containing monomers.

Of the homo-, co- and terpolymers containing at least one alkadienol which are of use in the adhesives of this invention, rubbery copolymers of an alkadienol and a conjugated diene, such as either 2,4-pentadien-1-ol or 2-methylene-3-buten-1-ol with either 1,3-butadiene or isoprene as well as rubbery terpolymers prepared from either 2,4-pentadien-1-ol or 2-methylene-3-buten-1-ol and either 1,3-butadiene or isoprene and a vinylidene group-containing monomer such as styrene are the preferred polymers.

The above-described polymers can contain from 0.1 to 100 percent by weight of monomer units derived from alkadienol and preferably from 1 to 20 weight percent alkadienol. In addition to the alkadienol, the co- or terpolymers can contain conjugated diene monomer units and vinyl aromatic monomer units. The amounts of these units will generally range from about 100/0 to about 60/40, preferably from about 80/20 to about 65/35 weight ratio of conjugated diene/vinylaromatic.

The homo-, co- or terpolymers as described above are prepared by methods well known in the art such as set forth in copending applications, Ser. No. 625,743, filed Oct. 24, 1975, and Ser. No. 625,746, filed Oct. 24, 1975. Emulsion polymerization is particularly well known and useful in the production of the preferred polymers.

The adhesion promoters useful in the pressure-sensitive adhesives include compounds of the general formula $(R''Z)_nY$ wherein Y is Si, B or CO; wherein Z is O, S, NH or NR'' with the proviso that Z can be NH or NR'' only when Y is Si; wherein n is 2 if Y is CO, 3 if Y is B and 4 if Y is Si; and wherein the R'' groups can be the same or different and are alkyl or cycloalkyl groups containing from 1 to 18 and preferably 1 to 10 carbon atoms per R'' group with the further proviso that the adhesion promoters contain no more than 40 carbon atoms per molecule. For solvent-containing pressure-sensitive adhesives and for hot melt pressure-sensitive adhesives it is especially preferred that the adhesion promoters contain 1 to 3 and 5 to 10 carbon atoms per R'' group, respectively.

Specific examples of compounds useful as adhesion promoters include dimethyl carbonate, diethyl carbonate, diisopropyl carbonate, di-n-hexyl carbonate, dicyclohexyl carbonate, di-n-decyl carbonate, methyl ethyl carbonate, trimethyl borate, triethyl borate, tri-n-butyl borate, tri-2-heptyl borate, tricyclopentyl borate, methyl ethyl n-propyl borate, tetramethyl silicate, tetraethyl silicate, tetra-n-octyl silicate, tetra-n-decyl silicate, trimethyl cyclohexyl silicate, O,S-dimethyl thiocarbonate, S,S-diethyl dithiocarbonate, trimethyl thioborate, tetramethyl thiosilicate, N,N',N'',N'''-tetramethyl silane tetramine, octaethyl silane tetramine and the like. Tetraethylsilicate is preferred.

It is also within the scope of this invention to include as adhesion promoters alkoxy-terminated or cycloalkoxy-terminated polysiloxanes of the general formula

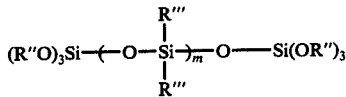

wherein R''' is methyl, ethyl or n-propyl; wherein R'' is as defined above and m is 0 or an integer of from 1 to about 30 and $(R''Z)_{n-x}SiR''_x$ wherein the R'' groups can be the same or different and are alkyl or cycloalkyl having from 1 to 18, preferably 1 to 10, carbon atoms per group, n is 4 and x is 1 to 2; Z is O, S, NH or NR''.

The inventive pressure-sensitive adhesive formulations can also include other ingredients well known in the adhesive art such as tackifiers, stabilizers, solvents, and the like. Such tackifiers are exemplified by rosin, rosin derivatives, polyterpene resins, thermoplastic phenolic resins, hydrogenated rosin esters of pentaerythritol, coumarone-indene resins and the like. Well-known and useful stabilizers include the hindered phenols, phosphites, dialkyl thiodicarboxylates, and the like. Useful solvents include the common hydrocarbon solvents such as pentane, n-hexane, n-heptane, isooctane, cyclohexane, benzene, toluene, etc.

These pressure-sensitive adhesives can be applied to the desired substrates as solution, emulsion or hot melt systems.

In the adhesive formulations tackifiers are normally employed in amounts ranging from 25 to 200 and preferably 75 to 150 parts by weight per 100 parts by weight polymer. Stabilizers are generally employed in amounts ranging from 0.1 to 5 and preferably 0.8 to 2 parts by weight per 100 parts by weight polymer. In solvent-containing adhesive formulations the solvent is generally present in the range of 100 to 1000 and preferably 300 to 600 parts by weight per 100 parts by weight of polymer. The adhesion promoter will generally be used in amounts ranging from 0.5 to 10 equivalents of promoter per equivalent of hydroxy group in the polymer (where one alkoxy or cycloalkoxy group in the adhesion promoter is equivalent to one hydroxy group in the polymer) and preferably from 1 to 5 equivalents of promoter per equivalent of polymer hydroxy group.

EXAMPLE

The following runs illustrate a pressure-sensitive adhesive prepared according to this invention and provide a comparison between the inventive formulation and a noninventive formulation which does not contain an adhesion promoter as described above.

A terpolymer of butadiene/styrene/2,4-pentadien-1-ol was prepared by emulsion polymerization employing the monomers in a weight ratio of 67/30/3, respectively and a polymerization temperature of 5° C for 7.2 hrs.

The resultant polymer (obtained in 61% conversion) possessed the following properties:

| Polymer | |
|---|---|
| 2,4-Pentadien-1-ol incorporation | a |
| Inherent viscosity[b] | 1.89 |
| Gel, %[b] | 0 |
| Mooney viscosity (ML-4)[c] | 40 |

[a]Not determined quantitatively. Infrared spectrum of polymer showed a small absorption band characteristic of OH group.
[b]Determined in accordance with procedure in U.S. 3,278,508, col. 20, notes (a) and (b) with the exception of using tetrahydrofuran as solvent.
[c]ASTM D 1646-61.

Adhesive formulations were prepared according to the following recipe. In Table I evaluation of the adhesive formulations is given.

| | Recipe | |
|---|---|---|
| | A | B |
| Polymer, pbw[a] | 5 | 5 |
| Tackifier[b], pbw | 5 | 5 |
| Tetraethyl silicate, pbw | 0.175[c] | 0 |
| Toluene, pbw | 28.3 | 28.3 |

[a]Parts by weight.
[b]Pentaerythritol ester of hydrogenated rosin.
[c]If final polymer is assumed to contain the same amount of 2,4-pentadien-1-ol as the monomer charge, i.e., 3 weight percent, then 0.175 pbw corresponds to 1.92 equivalents of Si(OC₂H₅)₄ per equivalent of hydroxy group in the polymer.

TABLE I

| Run No. | 1 | 2 | 3 | 4 |
|---|---|---|---|---|
| Recipe | A | A | B | B |
| Treatment | a | b | a | b |
| Creep resistance[c] | >192 | >192 | 22 | 22 |
| Probetack[d] | | | | |
| Immediate | 453 | 493 | 567 | 697 |
| 25° C - 1 day | 490 | 507 | 567 | 623 |
| 25° C - 7 day | 573 | 463 | 660 | 543 |
| 70° C - 1 day | 413 | 407 | 480 | 517 |

TABLE I-continued

| Run No. | 1 | 2 | 3 | 4 |
|---|---|---|---|---|
| 70° C - 7 day | 303 | 250 | 527 | 483 |

<sup>a</sup>Film was dried in dust-free cabinet at room temperature for 16-17 hours.
<sup>b</sup>Dried as in footnote (a) then heated at 60° C for 30 minutes.
<sup>c</sup>Measured as time in hours at 25° C for 1.6 mm slippage when 6.5 cm² of adhesive on Mylar film backing is bonded to stainless steel and loaded in shear with a 0.9 kg weight.
<sup>d</sup>Measured after the above-specified aging period and conditions using Polyken Probe tack tester manufactured by Testing Machines, Inc. Test conditions were: probe speed, 1 cm/sec; dwell time, 1 sec; contact force, 100 gm/cm².

The data in Table I illustrate the significantly improved creep resistance imparted to pressure sensitive adhesives by the practice of this invention. It will be noted that the vastly improved creep resistance of inventive Runs 1 and 2 compared to comparative Runs 3 and 4 is accompanied by a corresponding slight decrease in tack.

We claim:

1. A pressure-sensitive adhesive comprising:
   (1) a rubbery polymer having an alkadienol constituent and
   (2) an adhesion promoter conforming to the formula (R″Z)nY wherein Y is Si, B or CO; wherein Z is O, S, NH or NR″ with the proviso that Z can be NH or NR″ only when Y is Si; wherein n is 2 if Y is CO, 3 if Y is B and 4 if Y is Si; and wherein the R″ groups are the same or different and are chosen from alkyl or cycloalkyl groups containing from 1 to about 18 carbon atoms per group.

2. An adhesive of claim 1 wherein said rubbery polymer is prepared from at least one monohydroxyalkyl-substituted conjugated diene.

3. An adhesive of claim 2 wherein said rubbery polymer is prepared from monomers conforming to the formula

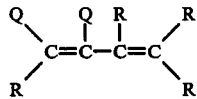

wherein R represents hydrogen, alkyl, cycloalkyl, aryl, aralkyl, alkaryl, or alkylcycloalkyl, with the R groups the same or different and wherein Q represents R as defined above or a hydroxyalkyl group represented by

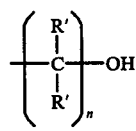

wherein each R' is hydrogen, methyl, or ethyl and n is 1, 2 or 3.

4. A pressure-sensitive adhesive comprising:
   (1) a rubbery polymer having an alkadienol constituent and
   (2) an adhesion promoter conforming to the formula

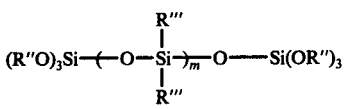

wherein R‴ is methyl, ethyl or n-propyl; wherein R″ is alkyl or cycloalkyl containing from about 1 to about 18 carbon atoms per group and wherein m is 0 or an integer of from 1 to about 30.

5. An adhesive of claim 4 wherein said rubbery polymer is prepared from at least one monohydroxyalkyl-substituted conjugated diene.

6. An adhesive of claim 5 wherein said rubbery polymer is prepared from monomers conforming to the formula

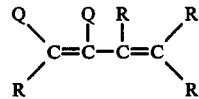

wherein R represents hydrogen, alkyl, cycloalky, aryl, aralkyl, alkaryl, or alkylcycloalkyl, with the R groups the same or different and wherein Q represents R as defined above or a hydroxyalkyl group represented by

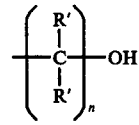

wherein each R' is hydrogen, methyl, or ethyl and n is 1, 2 or 3.

7. A method for improving the creep resistance of adhesive formulations comprising a rubbery polymer having an alkadienol constituent feed said method comprising combining therewith in an adhesive formulation an adhesion promoter chosen from the group consisting of
   (1) compounds conforming to the formula (R″Z)nY wherein Y is Si, B or CO; wherein Z is O, S, NH or NR″ with the proviso that Z can be NH or NR″ only when Y is Si; wherein n is 2 if Y is CO, 3 if Y is B and 4 if Y is Si; and wherein the R″ groups are the same or different and are chosen from alkyl or cycloalkyl groups containing from 1 to about 18 carbon atoms per group; and
   (2) compounds conforming to the formula

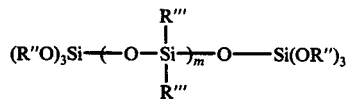

wherein R‴ is methyl, ethyl or n-propyl; wherein R″ is alkyl or cycloalkyl containing from about 1 to about 18 carbon atoms per group and wherein m is 0 or an integer of from 1 to about 30.

* * * * *